United States Patent
Fischer et al.

(10) Patent No.: US 8,208,750 B2
(45) Date of Patent: Jun. 26, 2012

(54) METHOD AND SYSTEM FOR DUAL-ENVELOPE IMAGE ENHANCEMENT

(75) Inventors: Mani Fischer, Haifa (IL); Doron Shaked, Tivon (IL); Carl Staelin, Haifa (IL); Renato Keshet, Hod Hasharon (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 1278 days.

(21) Appl. No.: 11/977,969

(22) Filed: Oct. 26, 2007

(65) Prior Publication Data

US 2009/0110323 A1   Apr. 30, 2009

(51) Int. Cl.
*G06K 9/00* (2006.01)
*G06K 9/40* (2006.01)
*G06K 9/54* (2006.01)
*G06K 9/60* (2006.01)
*H04N 5/228* (2006.01)
*H04N 5/14* (2006.01)
*H04N 5/57* (2006.01)

(52) U.S. Cl. ........ 382/274; 382/128; 382/162; 382/254; 382/307; 348/222.1; 348/671; 348/687

(58) Field of Classification Search .......... 382/162–172, 382/254–255, 260, 270, 274; 348/222.1–224.1, 348/571, 575–576, 582, 671–675, 687, 708
See application file for complete search history.

(56) References Cited

U.S. PATENT DOCUMENTS

| | | | |
|---|---|---|---|
| 7,933,468 B2* | 4/2011 | Yang | 382/274 |
| 2002/0154323 A1* | 10/2002 | Sobol et al. | 358/1.9 |
| 2004/0160525 A1* | 8/2004 | Kingetsu et al. | 348/364 |
| 2005/0073702 A1* | 4/2005 | Shaked et al. | 358/1.9 |
| 2005/0152612 A1* | 7/2005 | Spaulding et al. | 382/254 |
| 2007/0036456 A1* | 2/2007 | Hooper | 382/274 |
| 2009/0034871 A1* | 2/2009 | Keshet et al. | 382/274 |

OTHER PUBLICATIONS

Elad, "Retinex by Two Bilateral Filters", pp. 217-229 of Scale Space and PDE Methods in Computer Vision, 2005, Springer Berlin.*
Moroney and Tastl, "Comparison of Retinex and iCAM for Scene Rendering", SPIE Journal of Electronic Imaging 13(1), 139-145 (Jan. 2004).*
Shaked, D., Keshet, R.: Robust recursive envelope operators for fast retinex. Hewlett-Packard Research Laboratories Technical Report, HPL-2002-74R1 (2002).*

* cited by examiner

*Primary Examiner* — Anand Bhatnagar
*Assistant Examiner* — Nathan Bloom

(57) ABSTRACT

Various embodiments of the present invention are directed to methods and systems for processing signals, particularly signals encoding two-dimensional images, such as photographs, video frames, graphics, and other visually displayed information. In various method embodiments of the present invention, an input image signal is decomposed into an upper-envelope function, a lower-envelope function, and a details function. One or both of the upper-envelope and lower-envelope functions are then modified to produce one or more image-enhancing effects when the modified upper-envelope and lower-envelope functions are recombined with the details function to produce an enhanced image signal.

20 Claims, 24 Drawing Sheets

202

Y(2,8) = 97

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Figure 2

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

402

404  H(1,2) = 0.1

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| | 0 | 0 | | | | | | | | | | | | | |
|---|---|---|---|---|---|---|---|---|---|---|---|---|---|---|---|
| | | | | | | | | | | | | | | | |

Figure 4C

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| | 0 | 0 | 1 | | | | | | | | | | | | |
|---|---|---|---|---|---|---|---|---|---|---|---|---|---|---|---|
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

Figure 4D

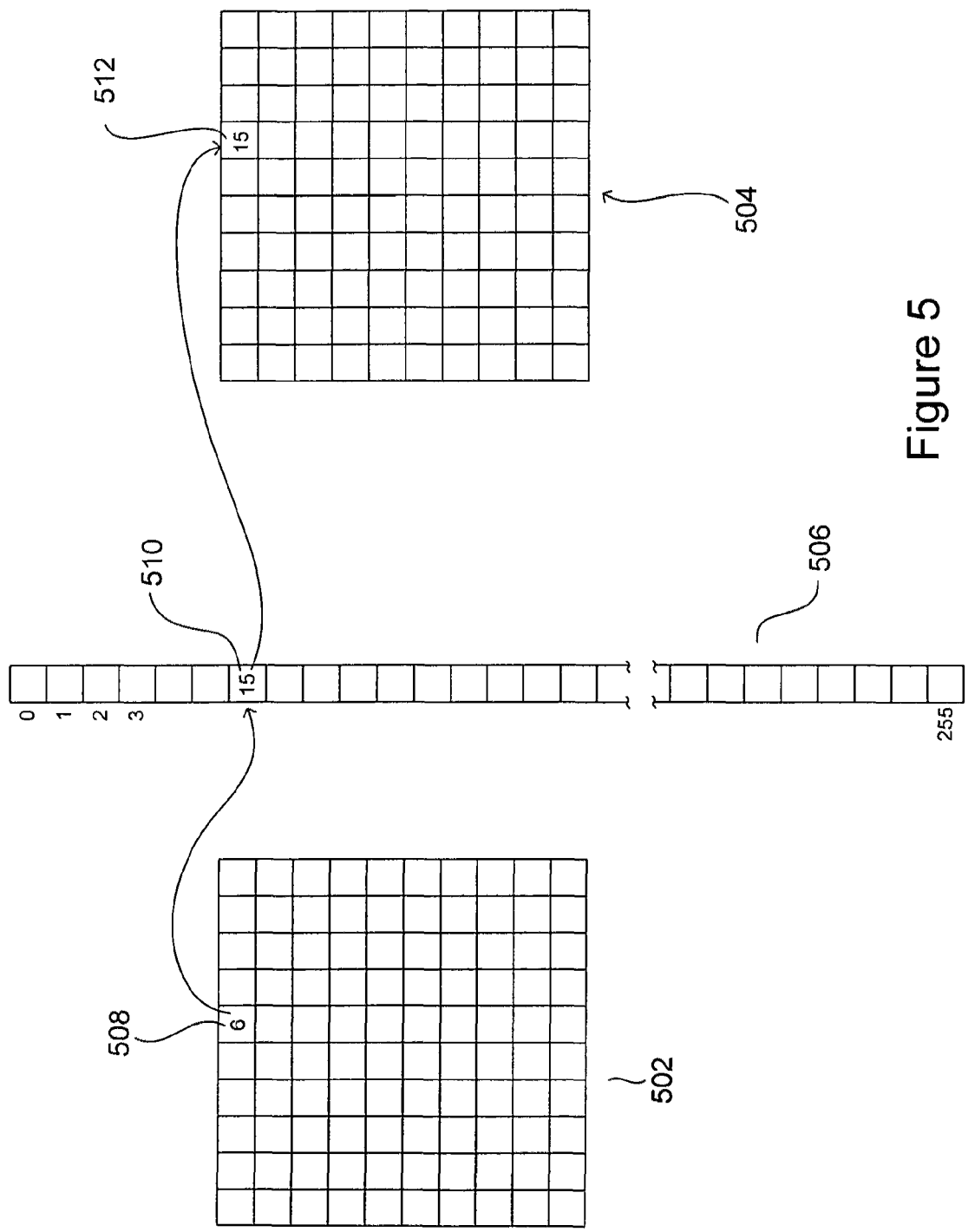

METHOD AND SYSTEM FOR DUAL-ENVELOPE IMAGE ENHANCEMENT

TECHNICAL FIELD

The present invention is related to signal processing and, in particular, to a method and system for enhancing an image signal by computing and modifying upper and lower envelopes.

BACKGROUND OF THE INVENTION

Computational methods for signal processing provide foundation technologies for many different types of systems and services, including systems and services related to recording, transmission, and rendering of signals that encode images and graphics, including photographic images, video signals, and other such signals. Over the years, many different types of image-enhancement functionalities have been devised and implemented, including computational routines and/or logic circuits that implement sharpening, local and global contrast enhancement, denoising, and other such image-enhancement functionalities.

Unfortunately, in many cases, these image-enhancement techniques are separately applied in order to carry out a comprehensive, multifaceted image enhancement, leading to computational inefficiency. Application of any of various image-enhancement techniques may often produce uneven results across an image, and may lead to introduction of perceptible anomalies and artifacts that propagate through application of a series of separate image-enhancement techniques. In many cases, one type of enhancement may result in degradation of one or more characteristics of an image to which enhancement is not directed, so that comprehensive image-enhancement methods may comprise a series of tradeoffs and compromises. For all of these reasons, designers, developers, vendors, and users of image-enhancement software, image-enhancement-related logic circuits, image-enhancement-related systems and devices, and a large number of different types of devices that include image-enhancement functionality, have all recognized a need to continue to devise and develop improved computational methods for enhancing two-dimensional images and other signals, including signals that encode video frames, graphics, and other visually displayed information.

SUMMARY OF THE INVENTION

Various embodiments of the present invention are directed to methods and systems for processing signals, particularly signals encoding two-dimensional images, such as photographs, video frames, graphics, and other visually displayed information. In various method embodiments of the present invention, an input image signal is decomposed into an upper-envelope function, a lower-envelope function, and a details function. One or both of the upper-envelope and lower-envelope functions are then modified to produce one or more image-enhancing effects when the modified upper-envelope and lower-envelope functions are recombined with the details function to produce an enhanced image signal.

BRIEF DESCRIPTION OF THE DRAWINGS

FIG. 2 shows the two-dimensional image of FIG. 1 with numerical pixel values.
FIGS. 4A-E illustrate a convolution operation.
FIG. 5 illustrates a lookup-table operation.

DETAILED DESCRIPTION OF THE INVENTION

Embodiments of the present invention are directed to methods and systems for comprehensively enhancing image signals. In the following discussion, image signals and various mathematical operations carried out on image signals are first discussed, in a number of short subsections. Then, in a final subsection, embodiments of the present invention are discussed.

Images

Figure 1:
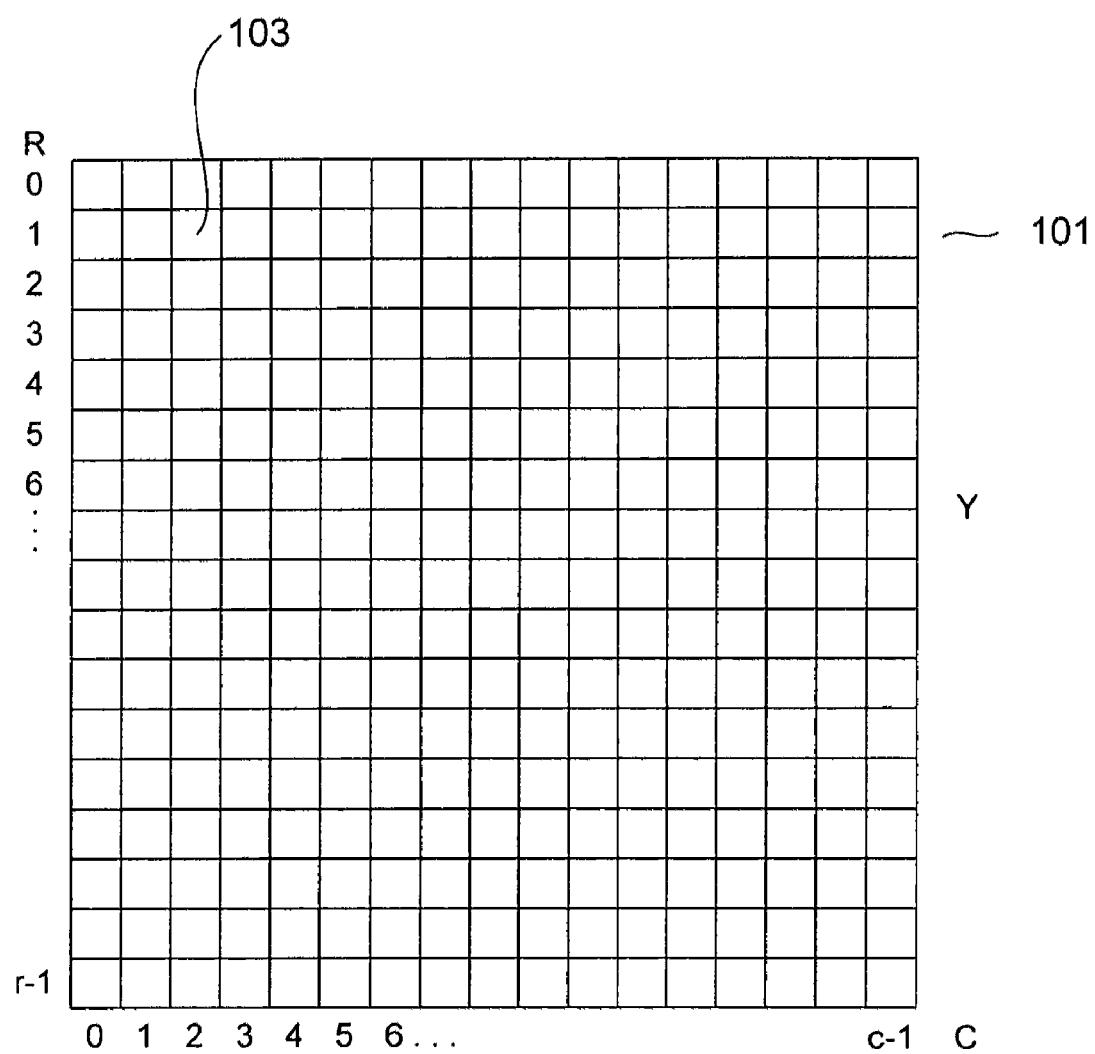
FIG. 1 illustrates a two-dimensional image signal.

FIG. 1 illustrates a two-dimensional image signal. As shown in FIG. 1, the two-dimensional image signal can be considered to be a two-dimensional matrix 101 containing R rows, with indices 0, 1, . . . , r-1, and C columns, with indices 0, 1, . . . , c-1. In general, a single upper-case letter, such as the letter "Y", is used to present an entire image. Each element, or cell, within the two-dimensional image Y shown in FIG. 1 is referred to as a "pixel" and is referred to by a pair or coordinates, one specifying a row and the other specifying a column in which the pixel is contained. For example, cell 103 in image Y is represented as Y(1,2).

FIG. 2 shows the two-dimensional image of FIG. 1 with numerical pixel values. In FIG. 2, each pixel is associated with a numerical value. For example, the pixel Y(2,8) 202 is shown, in FIG. 2, having the value "97". In certain cases, particularly black-and-white photographs, each pixel may be associated with a single, grayscale value, often ranging from 0, representing black, to 255, representing white. For color photographs, each pixel may be associated with multiple numeric values, such as a luminance value and two chrominance values, or, alternatively, three RBG values. In cases in which pixels are associated with more than one value, image-enhancement techniques may be applied separately to partial images, each representing a set of one type of pixel value selected from each pixel, image-enhancement techniques may be applied to a computed, single-valued-pixel image in which a computed value is generated for each pixel by a mathematical operation on the multiple values associated with the pixel in the original image, or image-enhancement techniques may be primarily applied to only the luminance partial image. In the following discussion, images are considered to be single-valued, as, for example, grayscale values associated with pixels in a black-and-white photograph. However, the disclosed methods of the present invention may be straightforwardly applied to images and signals with multi-valued pixels, either by separately enhancing one or more partial images or by combining the multiple values associated with each pixel mathematically to compute a single composite value associated with each pixel, thus creating a composite image, then enhancing the composite image, and finally modifying the pixel values as a function of the respective composite and enhanced composite values. In some cases the latter function also depends on the input pixel values, i.e. the function applied to dark pixels may be different from the function applied to bright pixels. It should be noted that, although images are considered to be two-dimensional arrays of pixel values, images may be stored and transmitted as sequential lists of numeric values, as compressed sequences of values, or in other ways. The following discussion assumes that, however images are stored and transmitted, the images can be thought of as two-dimensional matrices of pixel values that can be transformed by various types of operations on two-dimensional matrices.

In the following subsections, a number of different types of operations carried out on two-dimensional images are described. These operations range from simple numeric operations, including addition and subtraction, to convolution, scaling, and robust filtering. Following a description of each of the different types of operations, in separate subsections, a final subsection discusses embodiments of the present invention implemented using these operations.

Image Subtraction and Addition

Figure 3:
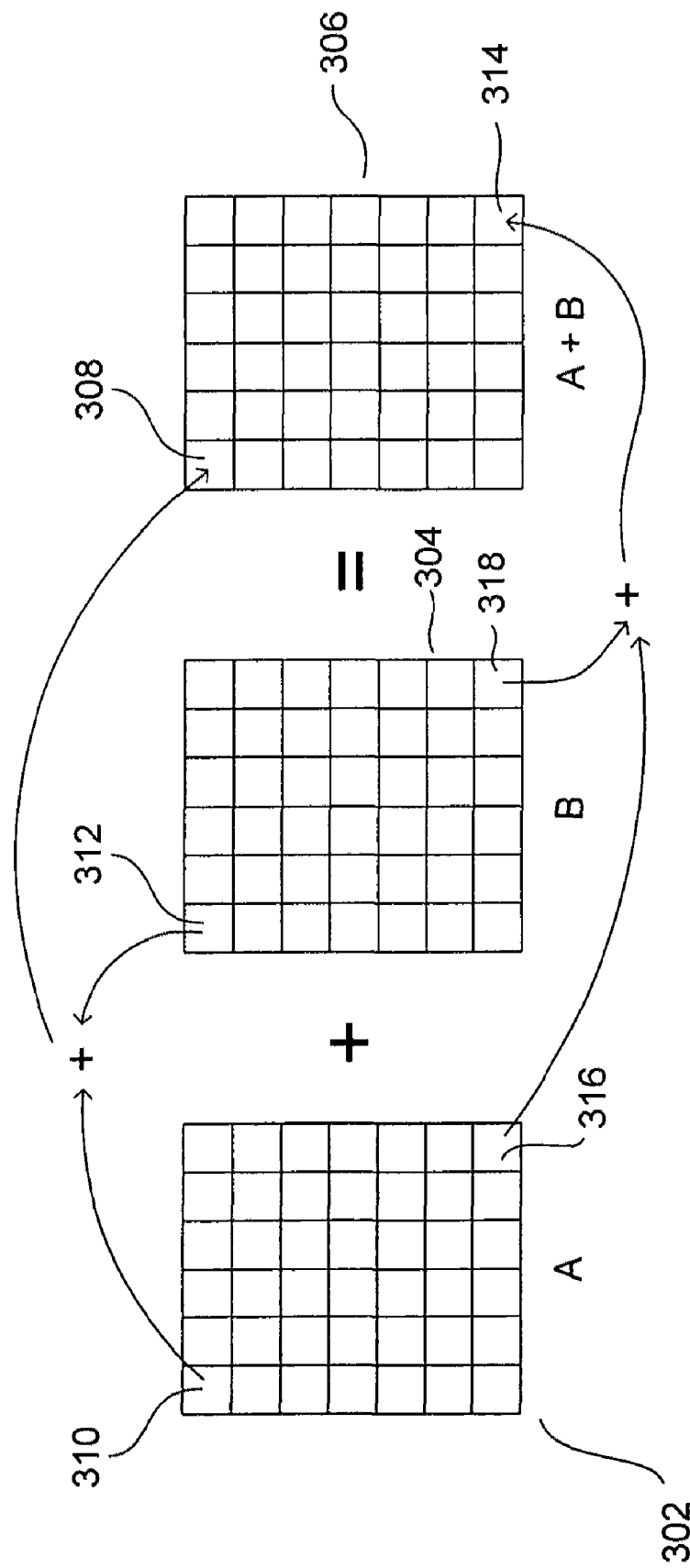
FIG. 3 illustrates addition of two images A and B.

FIG. 3 illustrates addition of two images A and B. As shown in FIG. 3, addition of image A 302 and image. B 304 produces a result image A+B 305. Addition of images is carried out, as indicated in FIG. 3, by separate addition of each pair of corresponding pixel values of the addend images. For example, as shown in FIG. 3, pixel value 308 of the result image 305 is computed by adding the corresponding pixel values 310 and 312 of addend images A and B. Similarly, the pixel value 314 in the resultant image 305 is computed by adding the corresponding pixel values 315 and 318 of the addend images A and B. Similar to addition of images, an image B can be subtracted from an image A to produce a resultant image A−B. For subtraction, each pixel value of B is subtracted from the corresponding pixel value of A to produce the corresponding pixel value of A−B. Images may also be pixel-by-pixel multiplied and divided.

Convolution

Figure 4A:
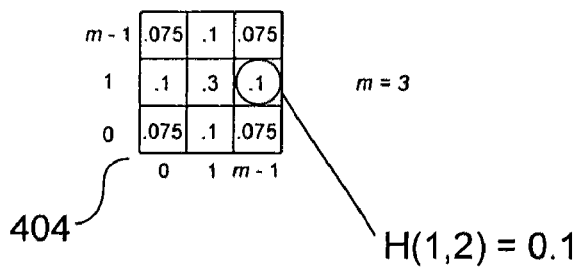

A second operation carried out on two-dimensional images is referred to as "convolution". FIGS. 4A-E illustrate a convolution operation. Convolution involves, in general, an image 402 and a mask 404. The mask 404 is normally a small, two-dimensional array containing numeric values, as shown in FIG. 4A, but may alternatively be a second image. Either an image or a mask may have a different number of rows than columns, but, for convenience, the example images and masks used in the following discussion are generally shown as square, with equal numbers of rows and columns. The image Y 402 in FIG. 4A has 17 rows and columns, while the mask 404 H has three rows and columns.

Figure 4B:
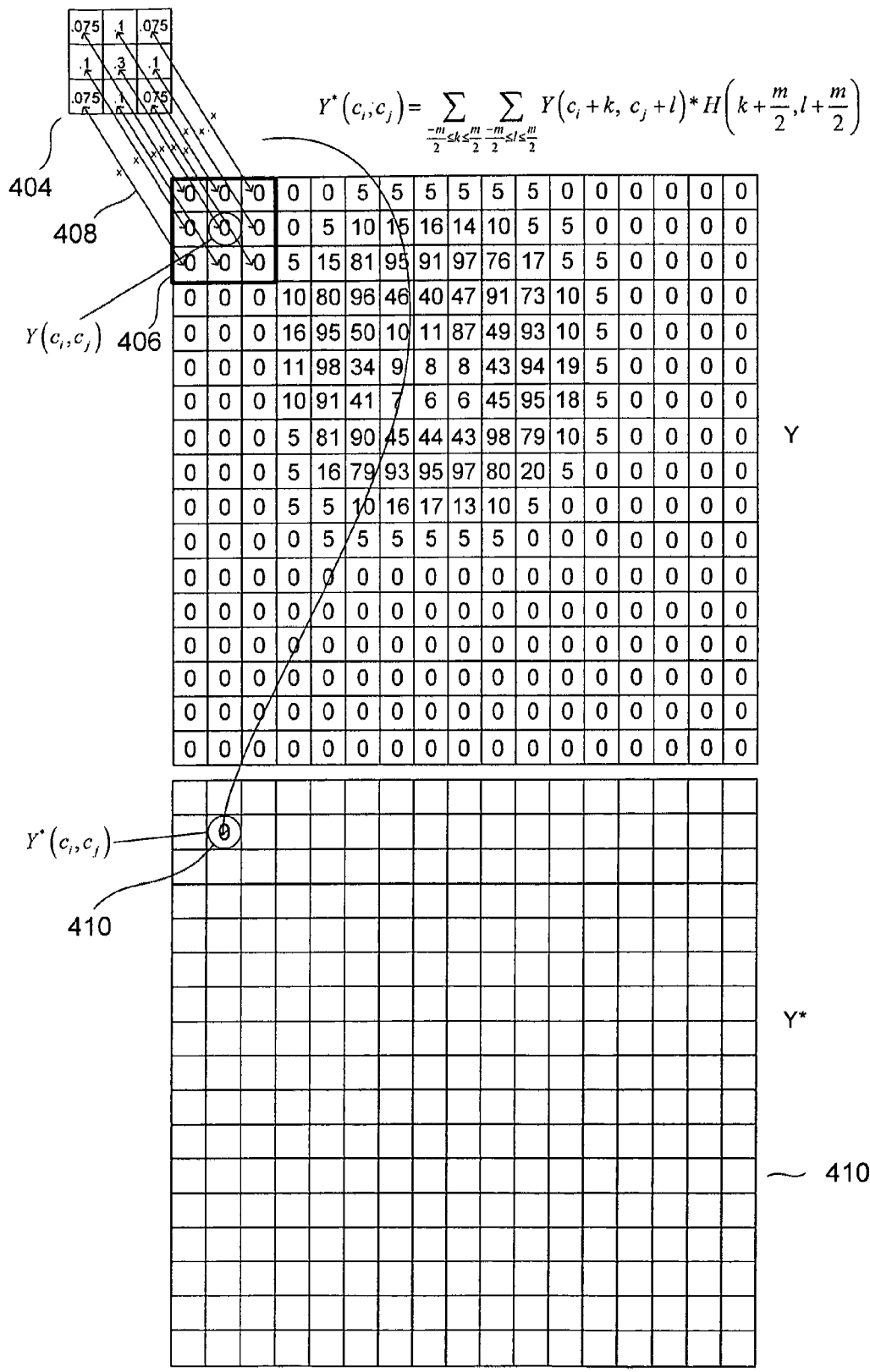

FIG. 4B illustrates computation of the first cell value, or pixel value, of the image Y* that is the result of convolution of image Y with mask H, expressed as:

$$Y^* = Y \otimes H$$

As shown in FIG. 4B, the mask H 404 is essentially overlaid with a region of corresponding size and shape 405 of the image centered at image pixel Y(1,1). Then, each value in the region of the image 405 is multiplied by the corresponding mask value, as shown by the nine arrows, such as arrow 408, in FIG. 4B. The value for the corresponding pixel Y*(1,1) 410 is generated as the sum of the products of the nine multiplications. In the general case, Y*($c_i$,$c_j$) is computed as follows:

$$Y*(c_i, c_j) = \sum_{-\frac{m}{2} \le k \le \frac{m}{2}} \sum_{-\frac{m}{2} \le l \le \frac{m}{2}} Y(c_i + k, c_j + l) * H\left(k + \frac{m}{2}, l + \frac{m}{2}\right)$$

where m is the size of each dimension of H, and k and l have only integer values within the ranges $$\frac{-m}{2} \le k \le \frac{m}{2}$$

and $$\frac{-m}{2} \le l \le \frac{m}{2}$$

and $$k + \frac{m}{2} \text{ and } l + \frac{m}{2}$$

also take on only integer values. FIGS. 4C and 4D illustrate computation of the second and third values of the resultant image Y*. Note that, because the mask H is a 3×3 matrix, the mask cannot be properly overlaid with image pixels along the border of image Y. In certain cases, special border masks may be used on boundary pixels, such as, for example, 2×3 masks for interior, horizontal boundary regions. In other cases, the boundary pixel values are simply transferred to the resultant image, without a mask-based transformation. In still other cases, the boundary pixels are omitted from the resultant image, so that the resultant image has fewer rows and columns than the original image. Details of treatment of boundary regions are not further discussed in the current application. It is assumed that any of the above-mentioned techniques for handling boundary pixels, or other appropriate techniques, may be applied to handle boundary pixels.

Figure 4E:
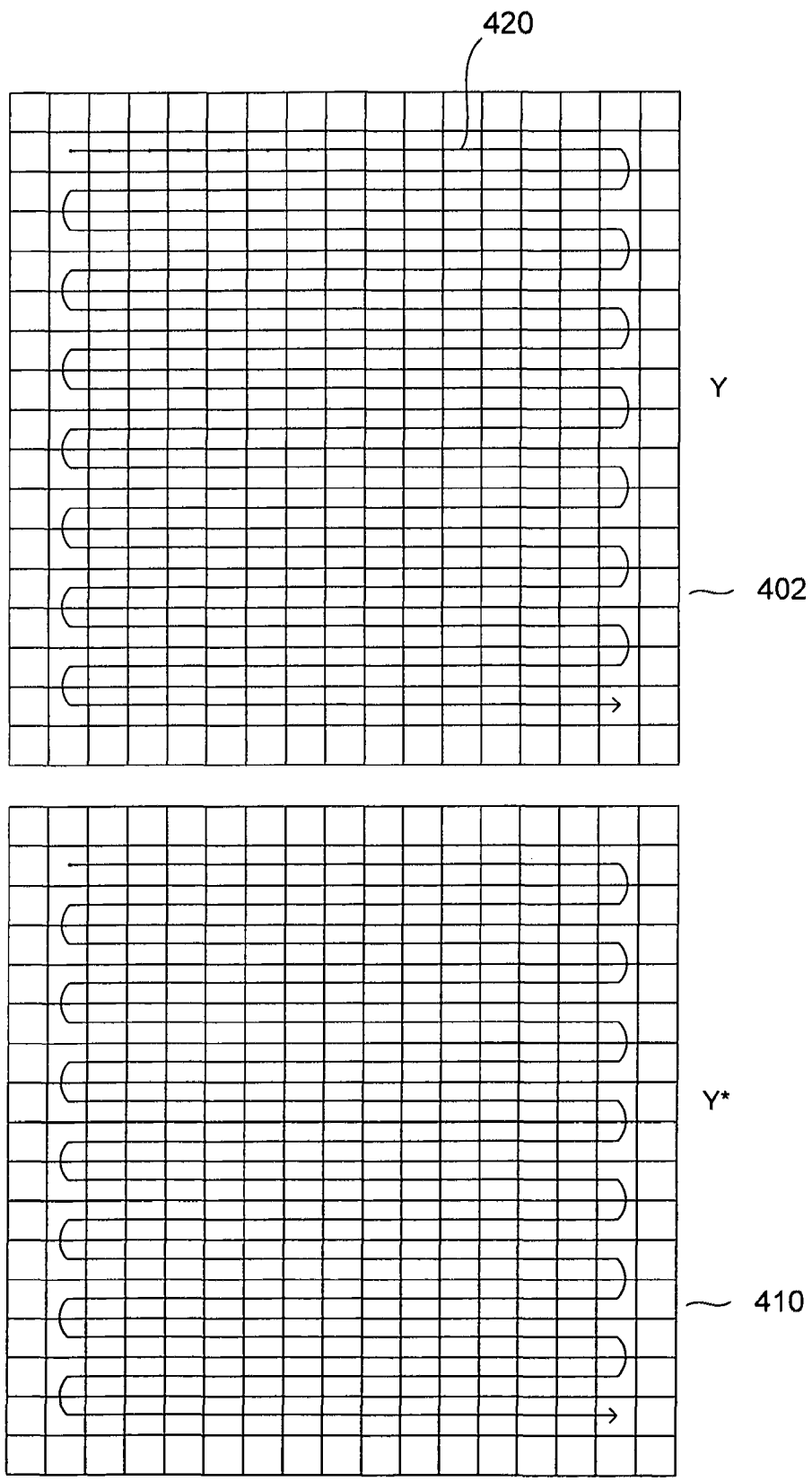

FIG. 4E illustrates a path of application of the mask H to image Y during convolution of Y×H to produce image Y*. In FIG. 4E, the path is represented by the curved arrow 420 and shows the series of successive pixels on which the mask is centered in order to generate corresponding values for the resultant image Y* 410. In alternative embodiments, a different ordering of individual mask-based operations may be employed. However, in all cases, a single mask-based operation, such as that shown in FIG. 4B, is applied to each non-boundary pixel of image Y in order to produce a corresponding value for the resultant image Y*.

A class of related operations are referred to as "filters". Filter operations also involve windows constructed about each pixel in am image. As with convolution operations, special windows may be used for boundary pixels. However, rather than employing a mask, filter operations compute result-image pixel values as a function of the pixel values within windows. Convolution operations can thus be considered to be a subset of the more general class of filter operations, where a convolution operation includes multiplication of pixel values within each window by constant values.

Lookup-Table Operations

FIG. 5 illustrates a lookup-table operation. A lookup-table operation is essentially application of any function that can be expressed or approximated as a set of discrete values to an image to produce a transformed image. FIG. 5 shows a first image 502 transformed by a lookup-table operation to produce a second, transformed image 504. In the lookup-table operation illustrated in FIG. 5, the lookup table 505 is a set of 255 values that together represent a function that transforms any grayscale or luminance value in the original image 502 to a corresponding, transformed grayscale or luminance value in the transformed image 504. In general, a luminance or grayscale value, such as the value "5" 508 in the original image 502, is used as an index into the lookup table, and the contents of the lookup table indexed by that value are then used as the corresponding transformed value for the transformed image. As shown in FIG. 5, the original-image grayscale or luminance value "5" indexes the seventh element 510 of the lookup table that contains the value "15". The value "15" is then inserted into the pixel position 512 of the transformed image 504 corresponding to the position of the pixel of the original image from which the index value is extracted. In a lookup-table operation, each luminance or grayscale value in the original image is transformed, via the lookup table, to a transformed value inserted into a corresponding position of the transformed image. Thus, a lookup-table operation is a pixel-by-pixel operation. In certain cases, two-dimensional or higher-dimensional lookup tables may be employed, when pixels are associated with two or more values, or when two or more pixel values are used for each pixel-value-generation operation. For example, a lookup-table operation may be used to transform a multi-value-pixel image to a single-value-pixel image. Any of a large number of different functions can be modeled as lookup-table operations. For example, any function that can be applied to the possible values in the original image to produce transformed values can be modeled as a lookup-table operation by applying the function to the possible values to generate corresponding transformed values and including the transformed values in a lookup table used to implement the lookup-table operation.

Embodiments of the Present Invention

Figure 6A:
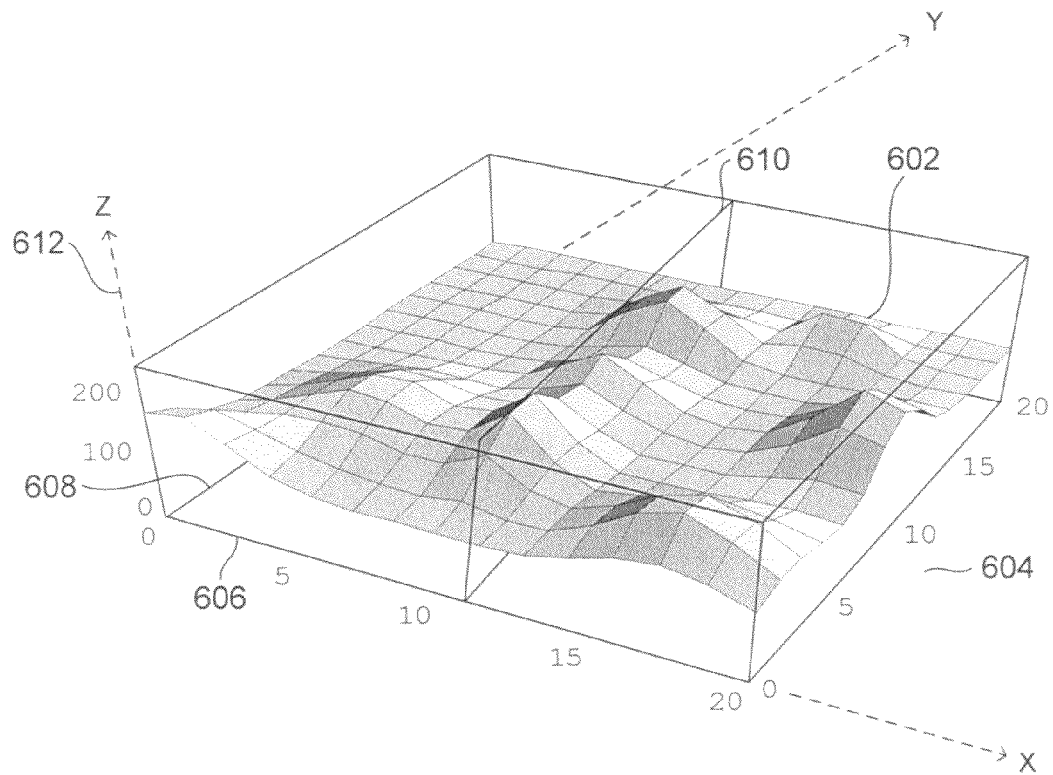
FIGS. 6A-B provide a three-dimensional representation of a small portion of a two-dimensional image.
Figure 6B:
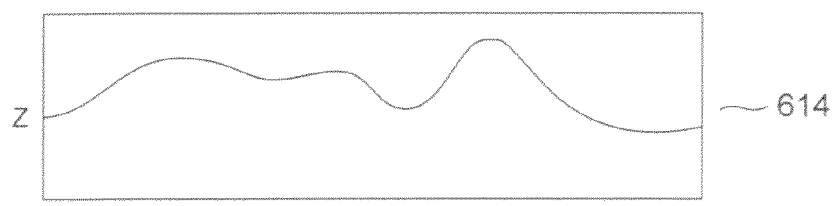

FIGS. 6A-B provide a three-dimensional representation of a small portion of a two-dimensional image. The surface 602 in the three-dimensional graph 604 shown in FIG. 6A represents the intensity values, or pixel values, associated with each pixel in a small, square region of a two-dimensional image bordered by an x-axis segment 606 and a y-axis segment 608. Thus, a two-dimensional image can be considered to be a three-dimensional surface above the two-dimensional image, with the z values corresponding to pixel values or, equivalently, to image intensities at particular points in the two-dimensional image. Although digital images are discrete, images can be, in many cases, practically viewed as continuous surfaces as shown in FIG. 6A.

The intersection of the surface 602 and a plane section 610 parallel to the z and y axes 612 and 608 is shown, in FIG. 6B, as a two-dimensional graph 614. Pixel values or image intensities along any line drawn through a two-dimensional image can be viewed as a one-dimensional function of spatial position along the line, x, plotted along a horizontal axis. The one-dimensional function assigns a pixel value, or image intensity, y, plotted with respect to a vertical axis, to each spatial position x. In the following discussion, two-dimensional graphs, such as two-dimensional graph 614 of FIG. 6B, are used to represent various concepts underlying method and system embodiments of the present invention, for ease of illustration. However, in all cases, the two-dimensional graphs can be considered to be plane sections of three-dimensional surfaces, just as two-dimensional graph 614 in FIG. 6B is a plane section 610 of a three-dimensional surface 602 shown in FIG. 6A, and all function discussed below are two-dimensional functions that assign various different values, or components of values, to each spatial position within a two-dimensional image.

Figure 7:
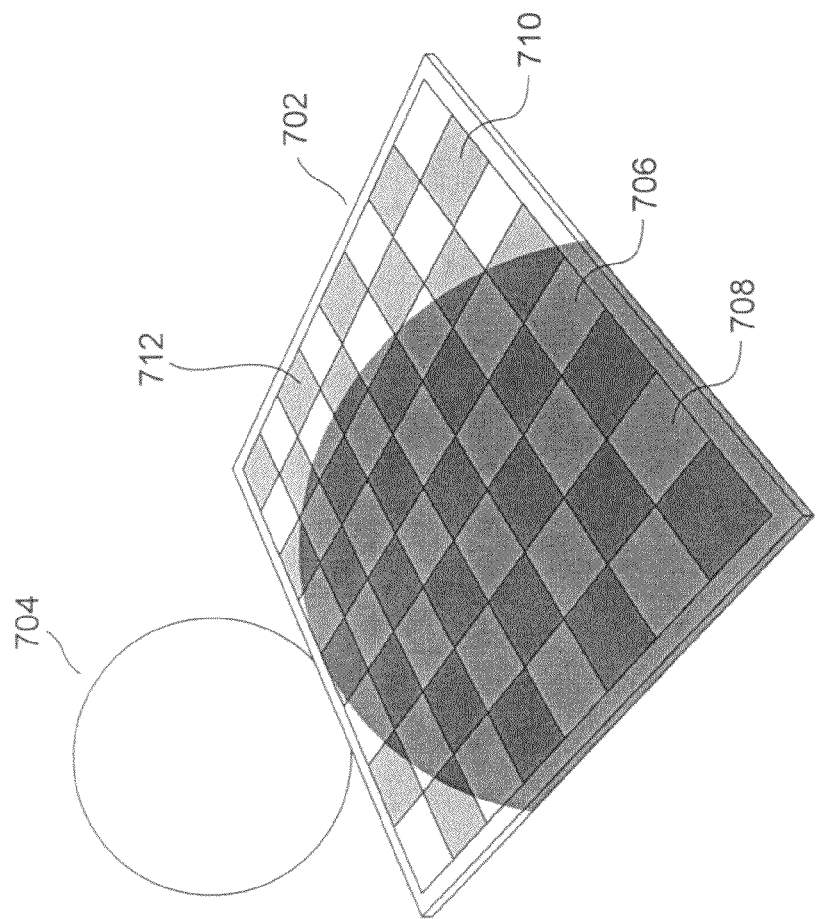
FIG. 7 illustrates the color-constancy effect in human visual perception.

A color-constancy effect in human visual perception was described, in 1971, by Edwin H. Land. Land formulated Retinex theory as an explanation of color constancy in human visual perception. FIG. 7 illustrates the color-constancy effect in human visual perception. In FIG. 7, a chess board 702 is illuminated by a light source, not shown in FIG. 7, behind a sphere 704. The sphere casts a shadow 706 across the chess board. Although, in the shaded region 706, the light squares, such as light square 708, have intensities equal to the intensities of dark squares in the unshaded portion 712 of the chess board, such as dark square 710, the human visual system adjusts for the different illumination of the unshaded portion 712 and shaded portion 708 of the chess board, so that a human observer perceives the light squares and dark squares as having constant colors across the entire chess board. In other words, the human visual system is able to extract absolute color information from scenes with widely varying illumination. By contrast, common image-recording devices, including film cameras, digital cameras, and digital video recorders, record different colors for the light squares in the shaded and unshaded regions of the chess board.

According to Retinex theory, the intensity $S_{(x,y)}$ at a position (x,y) in a recorded image, S, or pixel value $S_{(x,y)}$ at point (x,y) in a digitally recorded image, S, is equal to the reflectance of a point (x,y)' on an object in a recorded scene corresponding to the point (x,y) in the recorded image multiplied by the illumination of the object at that point in the recorded scene, or:

$$S(x,y)=R(x,y)'\cdot L(x,y)'$$

Simplifying this formula and disregarding the distinction between scene positions and recorded-scene positions:

$$S=R\cdot L.$$

Figure 8A:
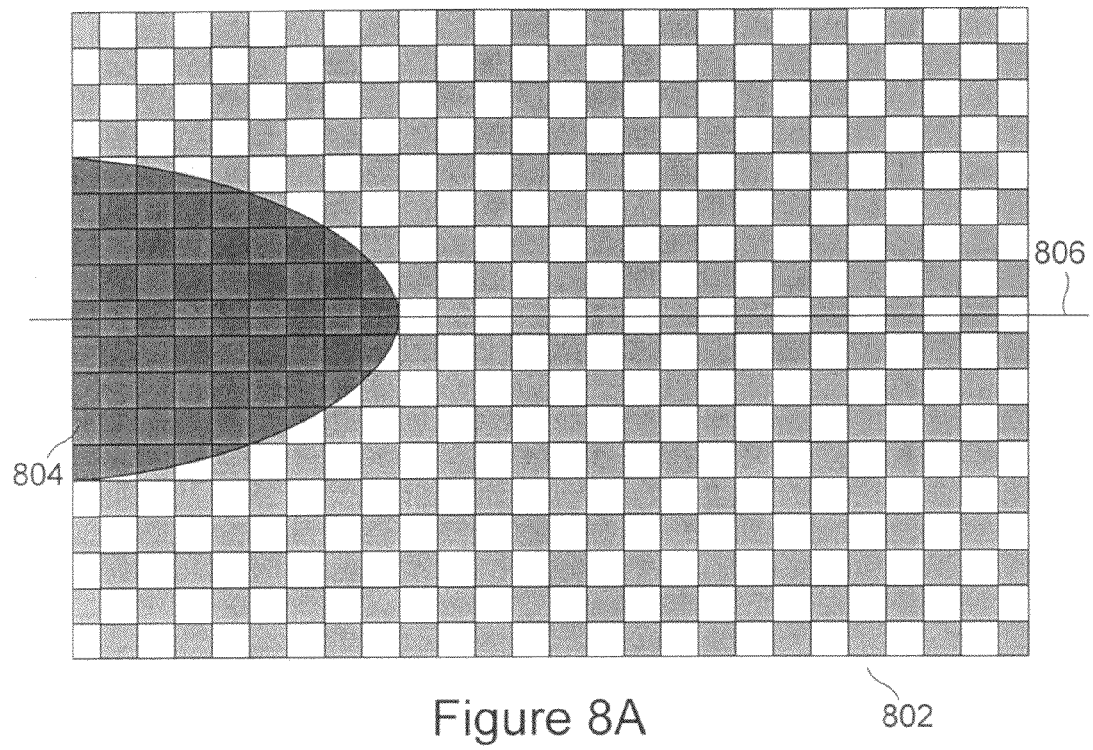
FIGS. 8A-9B illustrate the relationship between intensity, reflectance, and illumination.

FIGS. 8A-9B illustrate the relationship between intensity, reflectance, and illumination. FIG. 8A shows a small portion of an image of a chess-board-like pattern with unshaded and shaded regions. The chess-board-like pattern 802 contains a shaded region 804 with a paraboloid boundary. A line 806 drawn through the center of one row of dark. and light squares indicates the two-dimensional section parallel to the z axis and the x axis, with which the three-dimensional intensity surface corresponding to the image 802 is intersected in order to generate the one-dimensional function shown in subsequent two-dimensional graphs, such as the two-dimensional graph shown in FIG. 8B. In other words, line 806 is coincident with the x axis of the subsequent two-dimensional graphs.

Figure 8B:
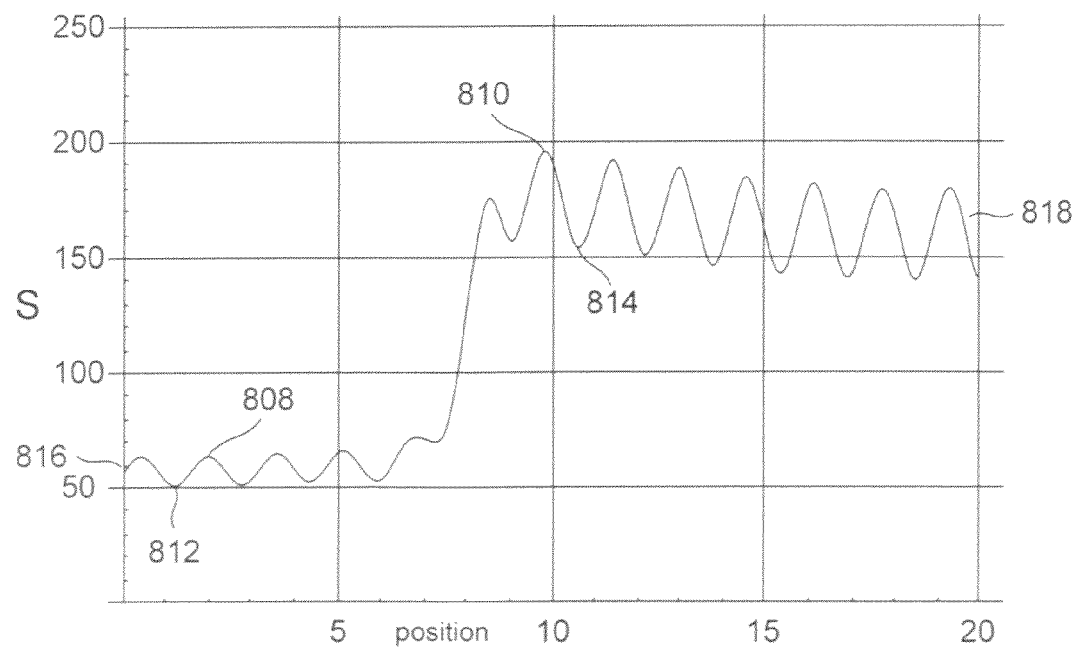

FIG. 8B shows a two-dimensional graph representing the intersection of the image-intensity surface of the image of the chess-board-like pattern, shown in FIG. 8A, with a plane normal to the y axis of a three-dimensional representation of the image-intensity surface, similar to the two-dimensional graph 614 in FIG. 6B representing the intersection of the image-intensity surface 602 with the plane section 610 in FIG. 6A. It should be noted that an image corresponding to the graph shown in FIG. 8B would appear blurred by comparison to the well-delineated image shown in FIG. 8A. The peaks occurring at regular intervals, including peaks 808 and 810, correspond to light squares, while the valleys, including valleys 812 814, correspond to the centers of dark squares. The first series of peaks and valleys 816, having intensities ranging from slighter greater than 50 to approximately 65, correspond to squares within the shaded portion 804 of the image 802 shown in FIG. 8A, while the second series of peaks and valleys 818, with intensities ranging from 140 to 190, correspond to light and dark squares within the unshaded portion of the image 802 shown in FIG. 8A. The two-dimensional graph shown in FIG. 8B is aligned with the image shown in FIG. 8A, so that the peaks and valleys are seen to correspond to the centers of columns in the chess-board-like pattern. The signal intensity S, plotted in FIG. 8B, thus clearly reflects both the pattern of light and dark squares as well as the shaded and unshaded portions of the image.

Figure 9A:
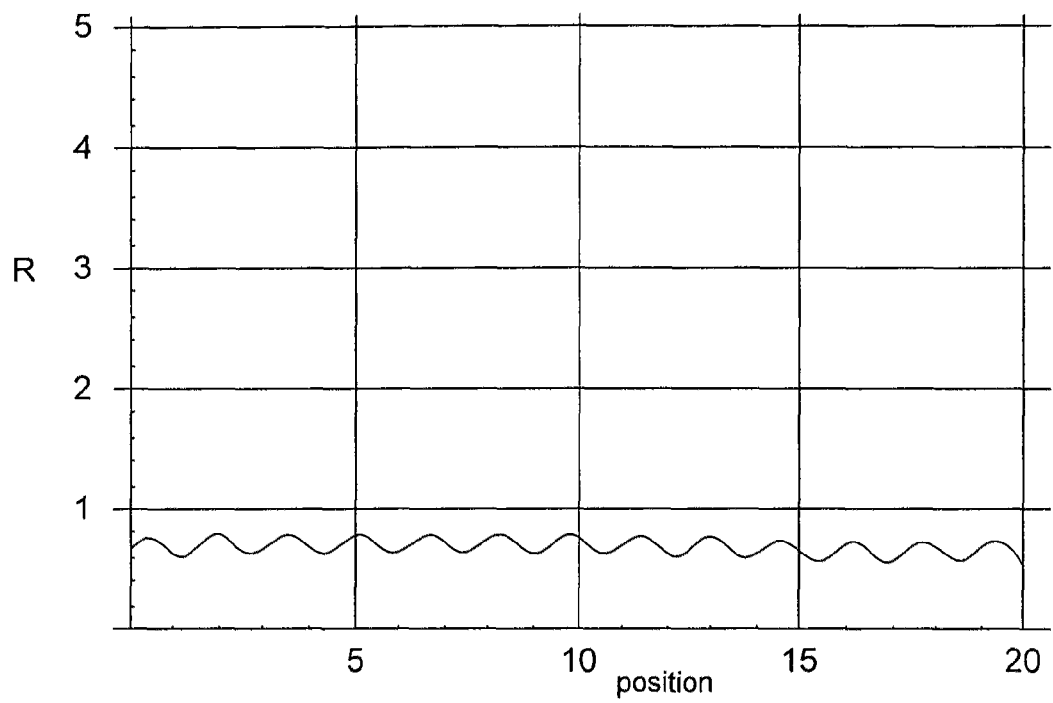
Figure 9B:
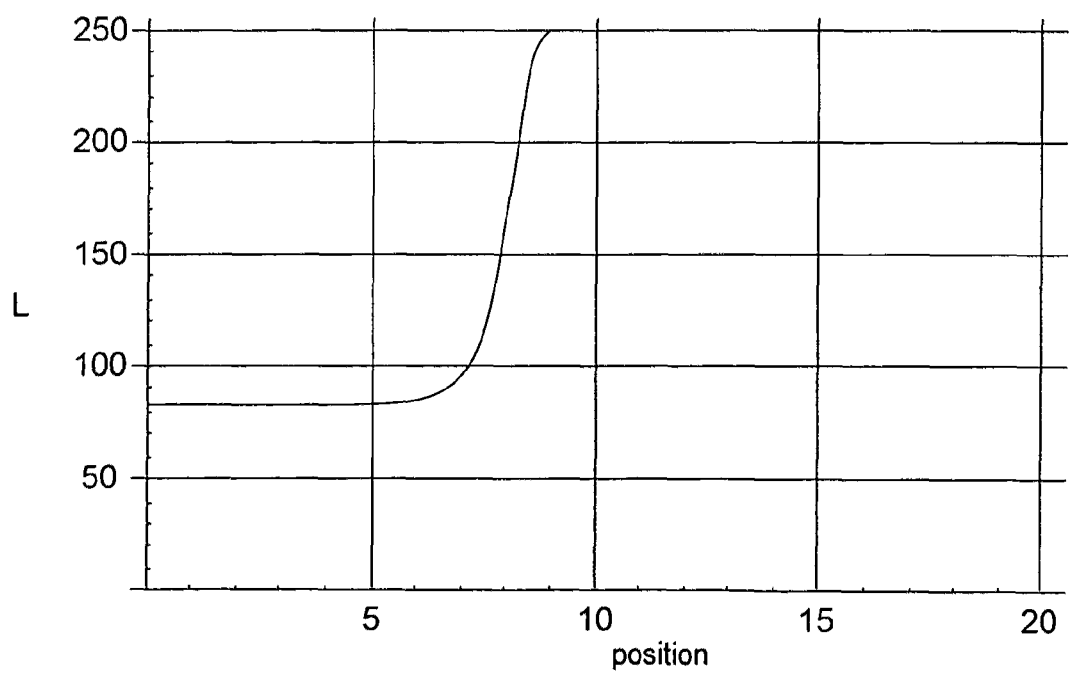

The intensity S for the image shown in FIG. 8A can be decomposed, according to Retinex theory, into a reflectance component R and an illumination component L. FIG. 9A shows a graph of reflectance versus spatial position along line 806 in image 802 shown in FIG. 8A, and FIG. 9B shows a graph of illumination along the same line. In the following discussion, the intensity signal S, reflectance R, illumination L, and other such processed signals are referred to as "functions", in the sense that these functions assign a value or value component to each spatial position within a two-dimensional image. These processed signals can also be considered to be intermediate image signals or intermediate images. Comparing the graph shown in FIG. 8B with the graphs shown in FIGS. 9A and 9B, it is apparent that multiplication of the illumination function L by the reflectance function R generates the intensity function S shown in FIG. 8B.

Although human visual perception is not fully understood, from a biological and computational standpoint, the color-constancy effect described by Land can be explained by assuming that the human visual perception system perceives reflectance, rather than intensity. More particularly, the human visual perception system correlates color dominantly with the reflectance component of a visual intensity signal. A variety of computational techniques have been developed to attempt to recover a reflectance-like component from recorded image intensities. However, while the intensity function shown in FIG. 8B is easily obtained when the reflectance and illumination functions, shown in FIGS. 9A and 9B, respectively, are known, it is not possible, mathematically and computationally, to determine a unique reflectance function and unique illumination function from a recorded intensity. As can be readily appreciated from the reflectance and illumination functions shown in FIGS. 9A and 9B, respectively, both functions can be modified significantly, and yet multiplication of the modified reflectance by the modified illumination function may nonetheless generate the same intensity function, shown in FIG. 8B, as generated by multiplying the unmodified reflectance and illumination functions. A real or rational intensity value $S_{(x,y)}$ can be generated by multiplication of an infinite number of different pairs or real or rational values. There are, in fact, an essentially limitless number of reflectance-function/illumination-function pairs that, when multiplied together, generate the intensity function shown in FIG. 8B. While it is impossible to recover the actual reflectance function R and illumination function L of a recorded scene from recorded light intensities S, various Retinex methods can be used to at least estimate regions of constant illumination within an image.

Often, in image processing, logarithms of the intensity, reflectance, and illumination, to an arbitrary base, such as 2, 10, or e, are employed, rather than the image, reflectance, and illumination. In this case, the expression for Retinex theory becomes:

$$\log(S) = \log(R) + \log(L)$$

or:

$$s = r + l.$$

Figure 10A:
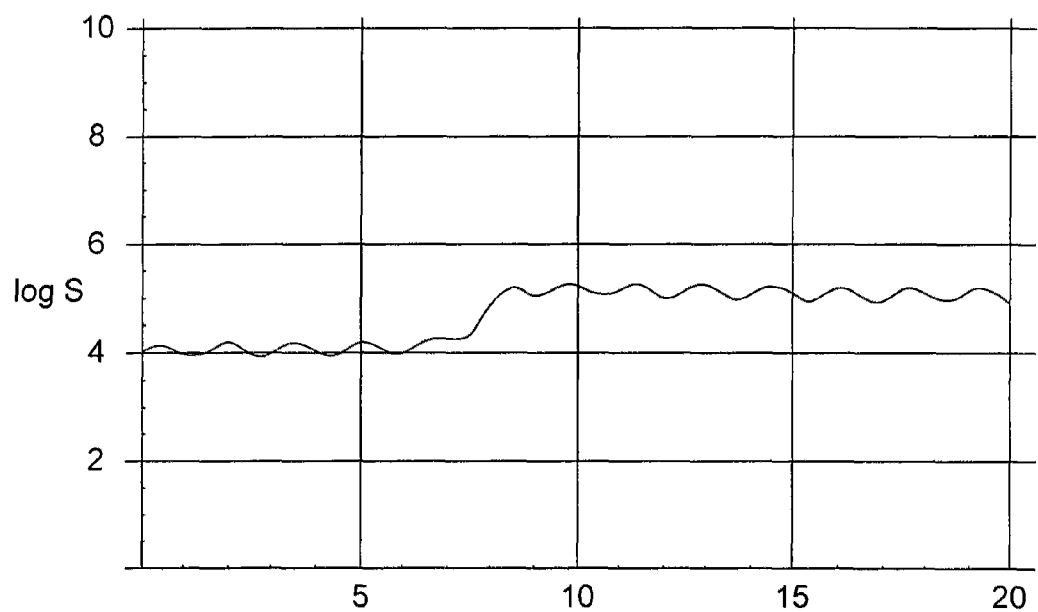
FIGS. 10A-C show the corresponding log-based functions log(S), log(R), and log(L) for the intensity function S shown in FIG. 8B, reflectance function R shown in FIG. 9A, and illumination function L shown in FIG. 9B, respectively.
Figure 10B:
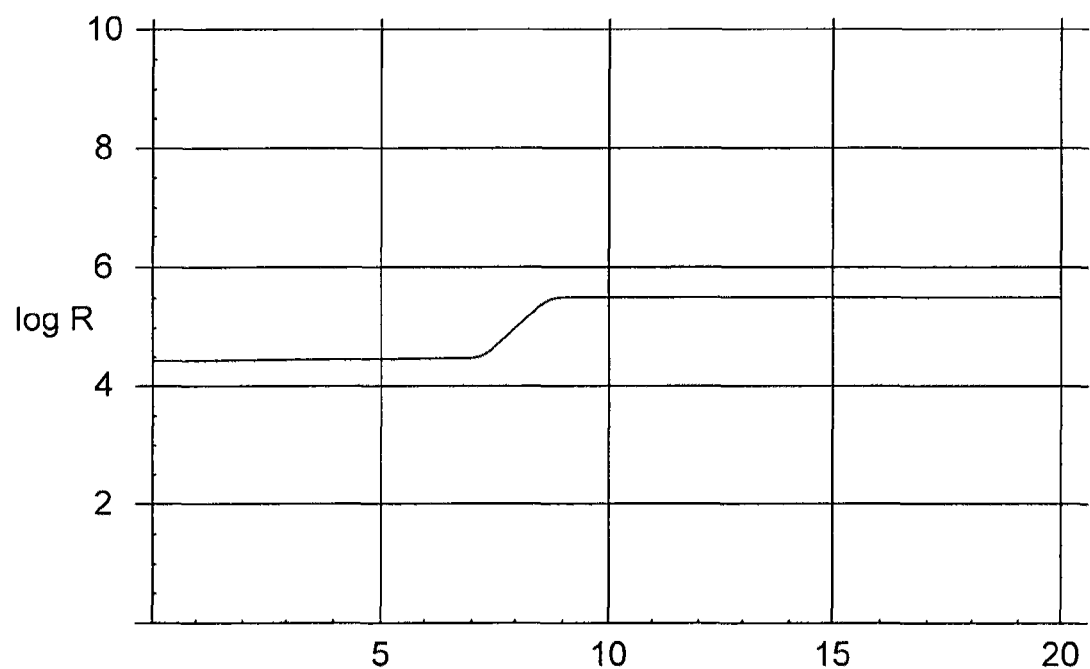
Figure 10C:
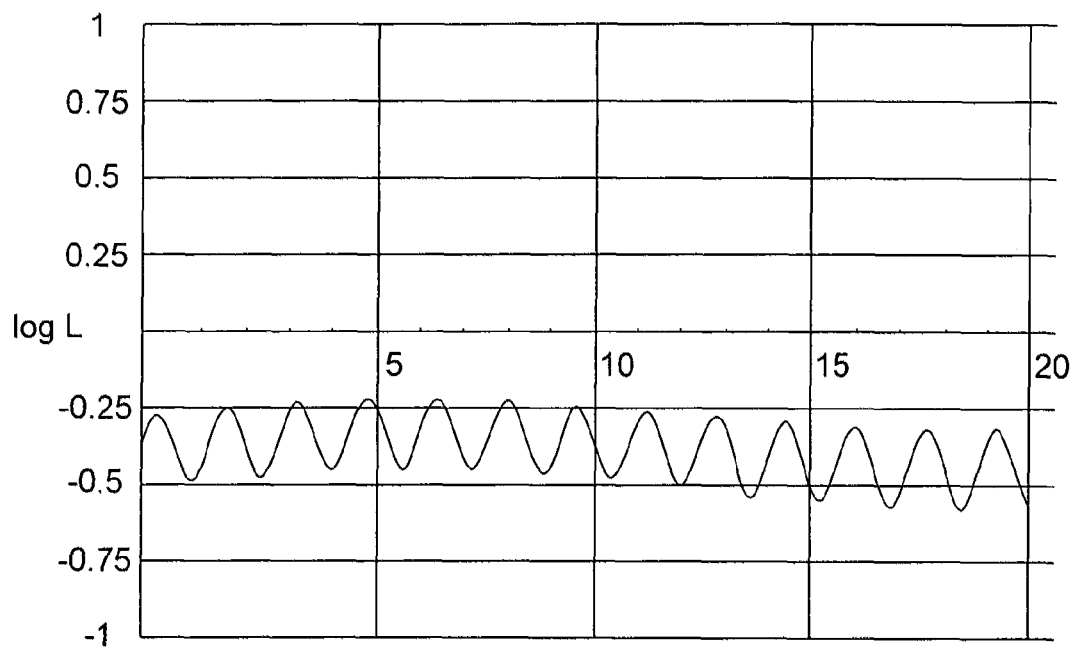

FIGS. 10A-C show the corresponding log-based functions log(S), log(R), and log(L) for the intensity function S shown in FIG. 8B, reflectance function R shown in FIG. 9A, and illumination function L shown in FIG. 9B, respectively. Addition of the log(R) function shown in FIG. 10B to the log L function shown in FIG. 10C produces the log(S) function shown in FIG. 10A.

Figure 11:
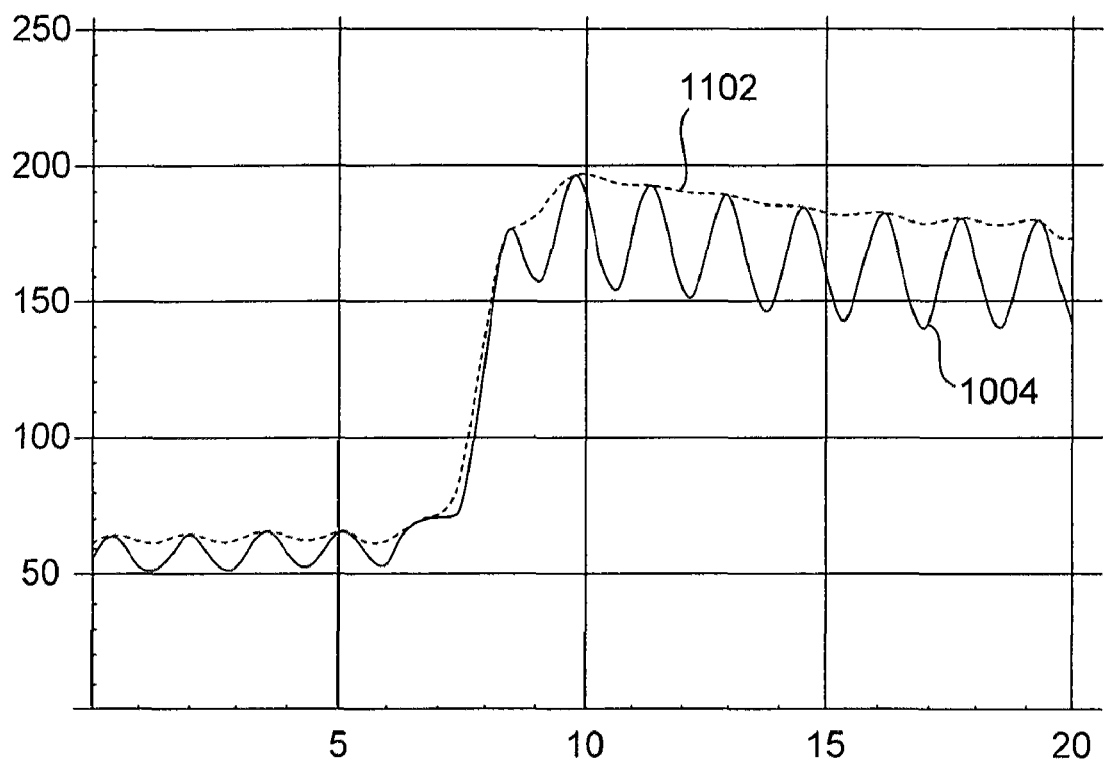
FIG. 11 illustrates an upper-envelope function U computed with respect to the intensity function S shown in FIG. 8B.

FIG. 11 illustrates an upper-envelope function U computed with respect to the intensity function S shown in FIG. 8B. In FIG. 11, the upper-envelope function U 1102 is shown as a dashed line above the intensity function S 1104. The upper-envelope function U is computed by a variety of different Retinex-based methods.

The upper-envelope function U roughly corresponds, within a constant multiplicative factor, to the theoretical illumination function L, discussed above. Various assumptions are made in the various Retinex-based methods for determining the illumination function L. One assumption is that, in an image of a scene that does not contain a direct light source, such as an illuminated light bulb or the sun, the illumination function L is everywhere greater than the intensity function S, or:

$$L \geq S.$$

In other words, reflectance can never be greater than 100 percent or:

$$0 \leq R \leq 1.$$

Another assumption is that the illumination function L is at least piecewise spatially smooth. A third assumption employed in various techniques is that the reflectance is also generally smooth. Additional assumptions may include assuming that U and L are at least piecewise spatially smooth, assuming that large gradients in an input image signal, $S_{in}$, are indicative of spatial discontinuity in U and L, and assuming that small contiguous alternating shaded regions and non-shaded regions within an image are indicative of an absence of spatial discontinuities in U and L.

In one technique, these assumptions lead to a minimization problem for determining log(L) or l, expressed as:

$$\min_{l \geq s} \lambda \|l - s\|_2^2 + \{\|D_x l\|_2^2 + \|D_y l\|_2^2\} + \alpha \{\|D_x(s - l)\|_2^2 + \|D_y(s - l)\|_2^2\}$$

where $\|l - s\|_2^2$ is the square of the 2-norm for log(R), or l−s; $D_x$ is a horizontal discrete derivative, and $D_y$ is a vertical discrete derivative. In one technique, a filter operator expressed as:

$$B_{W,P}\{x\} = \sum_{m=-P}^{P} \sum_{n=-P}^{P} (C_{m,n}x - x)^T W_{[m,n]}(s)(C_{m,n}x - x)$$

where $C_{m,n}x$ is a shift operator and $W_{[m,n]}(s)$ is a weight matrix, can be used to represent the Retinex model alternatively as:

$$\min_{l,r:l \geq s} \{\lambda_l \|l-s\|_2^2 + B_{W_l,Pl}\{l\}\} + a\{\lambda_r \|r-s\| + l_2^2 + B_{W_r,Pr}\{r\}\}$$

In this model, the log(L), or l, function is obtained by solving the minimization problem:

$$\min_{l:l \geq s} \lambda_l \cdot \|l-s\|_2^2 + B_{W_l,Pl}\{l\}$$

In a different Retinex method, based on the variational calculus, the problem of finding the illumination function is expressed as:

Minimize: $F[l] = \int_\Omega (|\nabla l|^2 + a(l-s)^2 + \beta |\nabla(l-s)|^2) dx \, dy$, Subject to: $l \geq s$, and $<\nabla l, \vec{n}> = 0$ on $\partial\Omega$, where $\Omega$ is the support of the image, $\partial\Omega$ is the image boundary, $\vec{n}$ is the normal to the boundary, and $\alpha$ and $\beta$ are free non-negative real parameters. In the functional F[l], the first penalty term ($|\nabla l|^2$) forces spatial smoothness on the illumination image. Additional approaches for estimating the illumination include an approach based on robust recursive envelope operators, various types of smoothing, techniques based on the Poisson equation, infinite impulse response filters, and other techniques. For the purposes of describing the present invention, it is assumed that one of many possible techniques currently available for estimating the illumination function L can be employed to obtain the upper-envelope function U for a given intensity function S representing a recorded image.

The intensity function S corresponding to an image can be inverted to produce the inverted intensity function S* by subtracting each value assigned by the function S to a spatial position from the maximum pixel value, assumed to be 255 in the current discussion. In other words:

$$S^* = 255 - S$$

Figure 12:
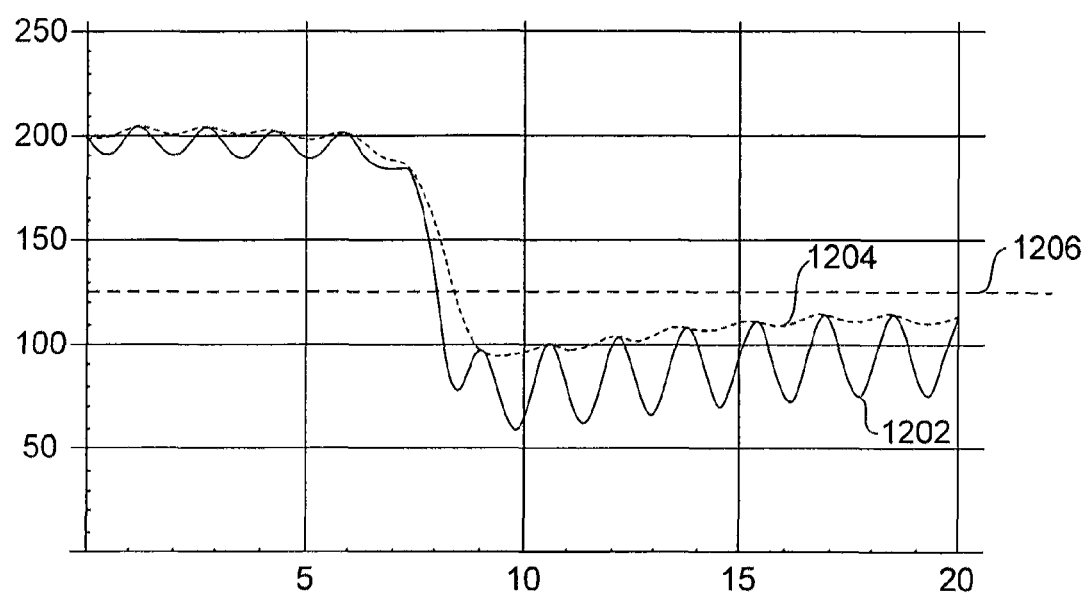
FIG. 12 shows the inverted intensity function S*, and an upper envelope U* computed for function S*, corresponding to the intensity function S and upper-envelope function U shown in FIG. 11.

An upper-envelope function U* can be calculated for the inverted image S* by the same techniques used to compute the upper envelope for the original image S. FIG. 12 shows the inverted intensity function S*, and an upper envelope U* computed for function S*, corresponding to the intensity function S and upper-envelope function U shown in FIG. 11. As can be seen in FIG. 12, both the function S* 1202 and the upper-envelope function U* 1204 are obtained as reflections of S and U, respectively, across a horizontal line that intersects the y axis at the point y=127.5, shown as dotted line 1206 in FIG. 12. Re-inverting U* then produces a lower-envelope function L for the original intensity function S:

$$L = 255 - U$$

Figure 13:
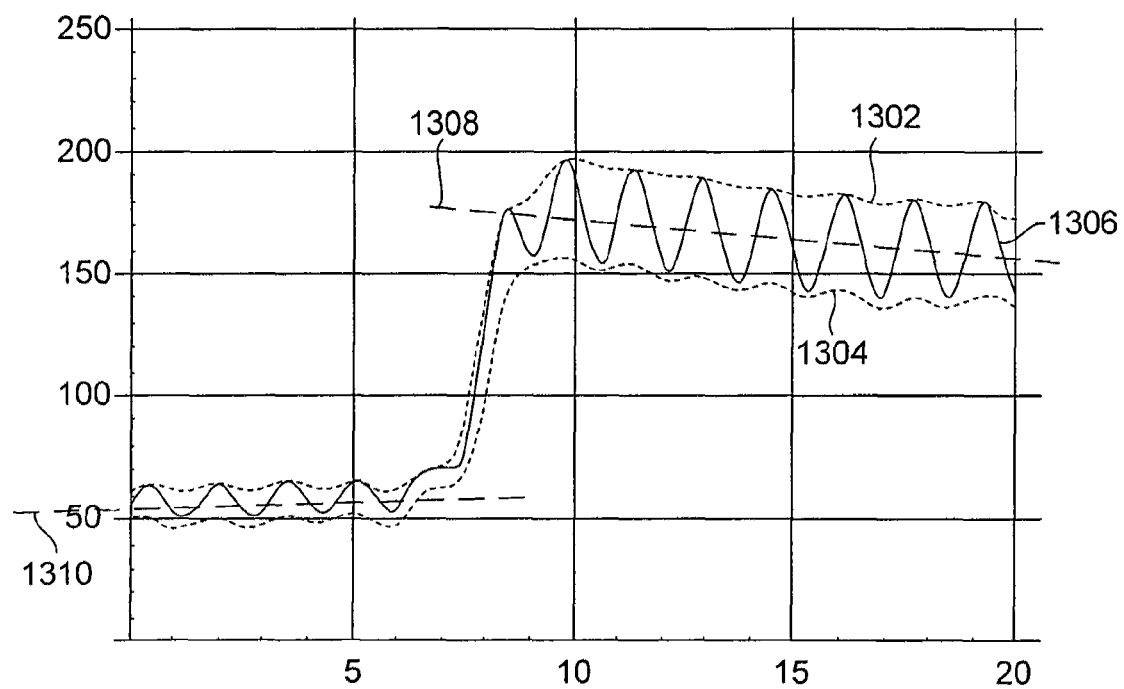
FIG. 13 shows the original intensity function S, shown in FIGS. 8A and 11, along with the upper-envelope function U and the lower-envelope function L.

Note that, in the following discussion, the symbol L is used to denote the lower-envelope function, rather than the illumination. FIG. 13 shows the original intensity function S, shown in FIGS. 8A and 11, along with the upper-envelope function U and the lower-envelope function L. The upper-envelope function U 1302 and the lower-envelope function L 1304 can be seen to bound the intensity function S 1306 from above and below.

The intensity function S can be alternatively characterized, parametrically, as the combination of U, L, and a details function D computed as:

$$D = \frac{S-L}{U-L}$$

The above expression can be considered to generate the detail function D from algebraic combination of the functions S, L, and U. Alternatively, the above expression can be considered to be a pixel-value operator that generates the details component of a pixel value from the pixel value and upper-envelope and lower-envelope components of the pixel value. Given the detail function D, the upper-envelope function U, and the lower-envelope function L, the original intensity function S can be computed from D, U, and L by:

$$S = D(U-L) + L$$

Figure 14:
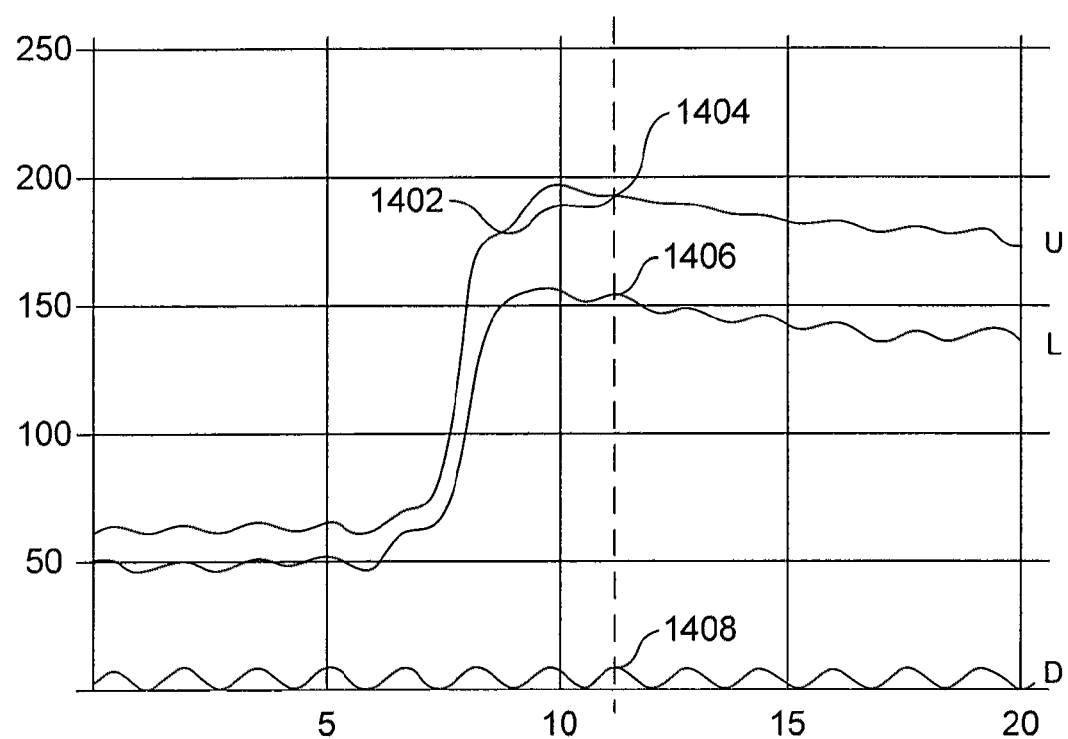
FIG. 14 shows the intensity function S of FIGS. 8A and 11 decomposed into the three functions U, L, and D.

FIG. 14 shows the intensity function S of FIGS. 8A and 11 decomposed into the three functions U, L, and D. The intensity value, or pixel value, $S_P$ at any spatial position P can be computed from the corresponding values $U_P$, $L_P$, and $D_P$ by:

$$S_P = D_P(U_P - L_P) + L_P$$

In other words, the pixel intensity 1402 can be computed by taking the difference in y values between points 1404 and 1406 and multiplying that difference by the y value of point 1408, and then adding they value of point 1406 to the result.

Figure 15:
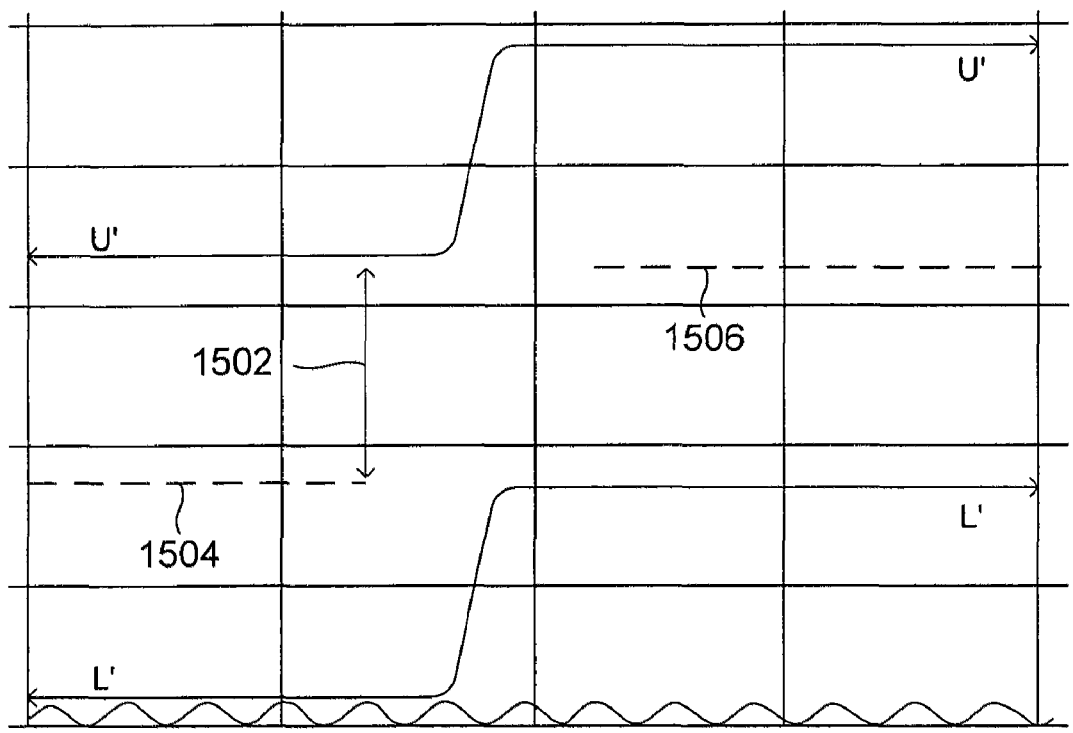
FIGS. 15 and 16 illustrate an image-enhancement method underlying various embodiments of the present invention.
Figure 16:
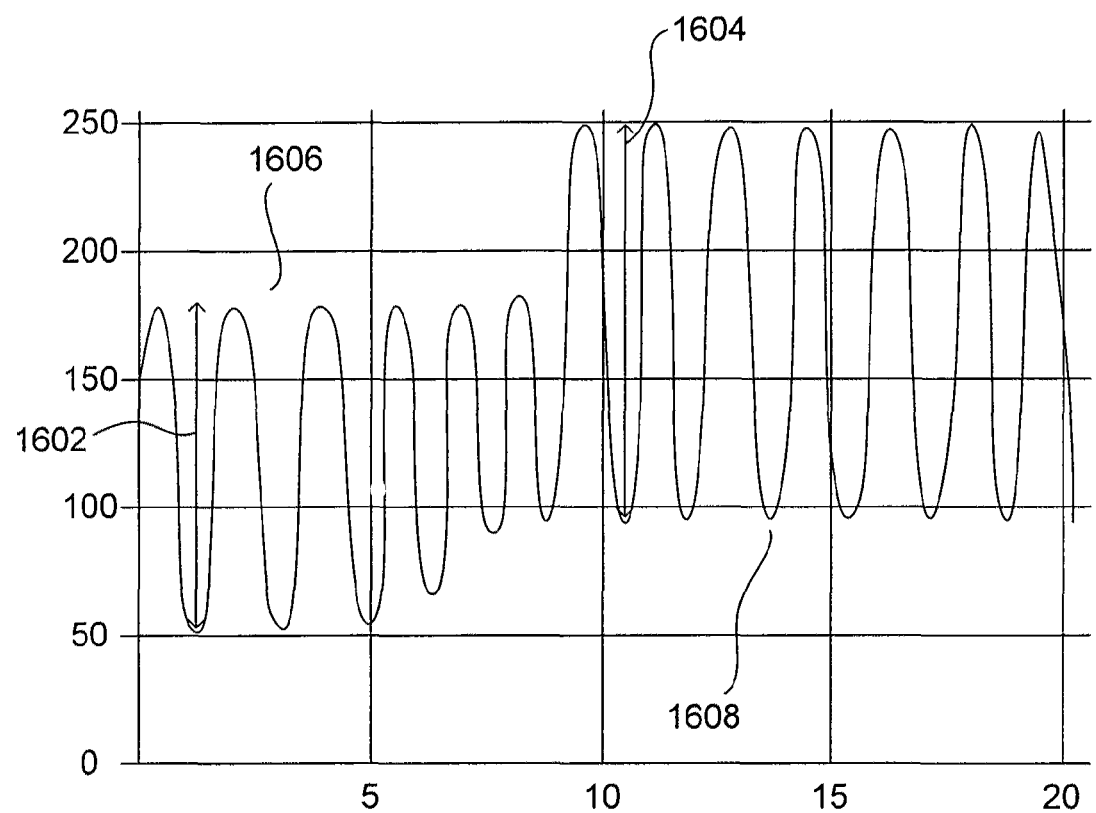

FIGS. 15 and 16 illustrate an image-enhancement method underlying various embodiments of the present invention. FIG. 15 illustrates an intermediate step in image enhancement that employs the upper-envelope, lower-envelope, and details functions U, L, and D shown in FIG. 14. In FIG. 15, the upper-envelope and lower-envelope functions U and L have been modified to produce corresponding, modified upper-envelope and modified lower-envelope functions U' 1502 and L' 1504. The function D 1506 is not altered. The functions U and L may be modified to achieve, concurrently, a variety of different image enhancement goals. For example, local contrast within regions of constant illumination can be enhanced by increasing the difference in magnitude between values of U' and L' with respect to the difference in magnitude between corresponding values of U and L. As another example, L' can be constructed to reach relatively low pixel values at its lowest point, and U' can be constructed to reach relatively high pixel values at its highest point, in order to effectively use the available dynamic range. Moreover, U' and L' can be constructed to decrease the difference between average pixel values in different positions of an image, in order to ameliorate greater-than-desirable contrasts between different image regions In FIG. 15, the difference 1502 between average shaded-region pixel values 1504 and average unshaded-region pixel values 1506 has been decreased with respect to the corresponding difference in FIG. 14. Additionally, tone mapping can be performed both locally and globally to more effectively employ the dynamic range of intensities displayed when the image is rendered, and local global brightening and darkening can be achieved by increasing or decreasing the average pixel values within particular regions of the image.

Once the upper-envelope function U is modified to U', and the lower-envelope function L is modified to L', as shown in FIG. 15, then the modified functions U' and L' can be used, along with the original detail function D, to generate an enhanced image $\overline{S}$ by:

$$\overline{S}=D(U'-L')+L'$$

FIG. 16 illustrates an enhanced image, $\overline{S}$, corresponding to the original image S shown in FIGS. 8A and 11, obtained using the modified functions U' and L' shown in FIG. 15. In the enhanced image $\overline{S}$, plotted in FIG. 16, local contrast 1602 and 1604 within the shaded 1606 and unshaded 1608 portions of the image has been significantly increased with respect to the original signal, shown in FIG. 13.

Many different image enhancements can be concurrently undertaken using the general method and system of the present invention. The upper-envelope function U and the lower-envelope function L can be modified in any number of different ways to produce any number of different U' and L' functions. The modified functions U' and L' may facilitate denoising, for example, and many other types of image enhancement.

The above, particular equation for $\overline{S}$ can also be generalized to read:

$$\overline{S}=f_{U',L'}(D)$$

where $f$ is any monotonic function of D, mapping the range [0, 1] of D values to the output range [U', L']. The above, particular equation for $\overline{S}$ employs a linear function $f_{U',L'}$. In an alternative embodiment, a Retinex-type average of the image, A, can be additionally incorporated by selecting the function $f_{U',L'}$ to be an S-shaped tone mapping function, where the S-inflection is collocated with the local average A.

Figure 17:
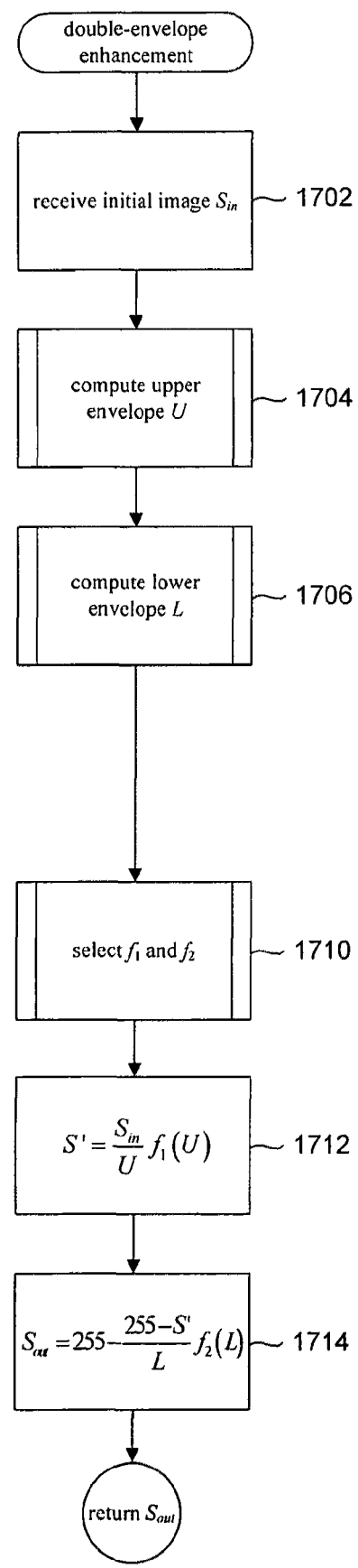
FIG. 17 illustrates one method embodiment of the present invention.
Figure 18:
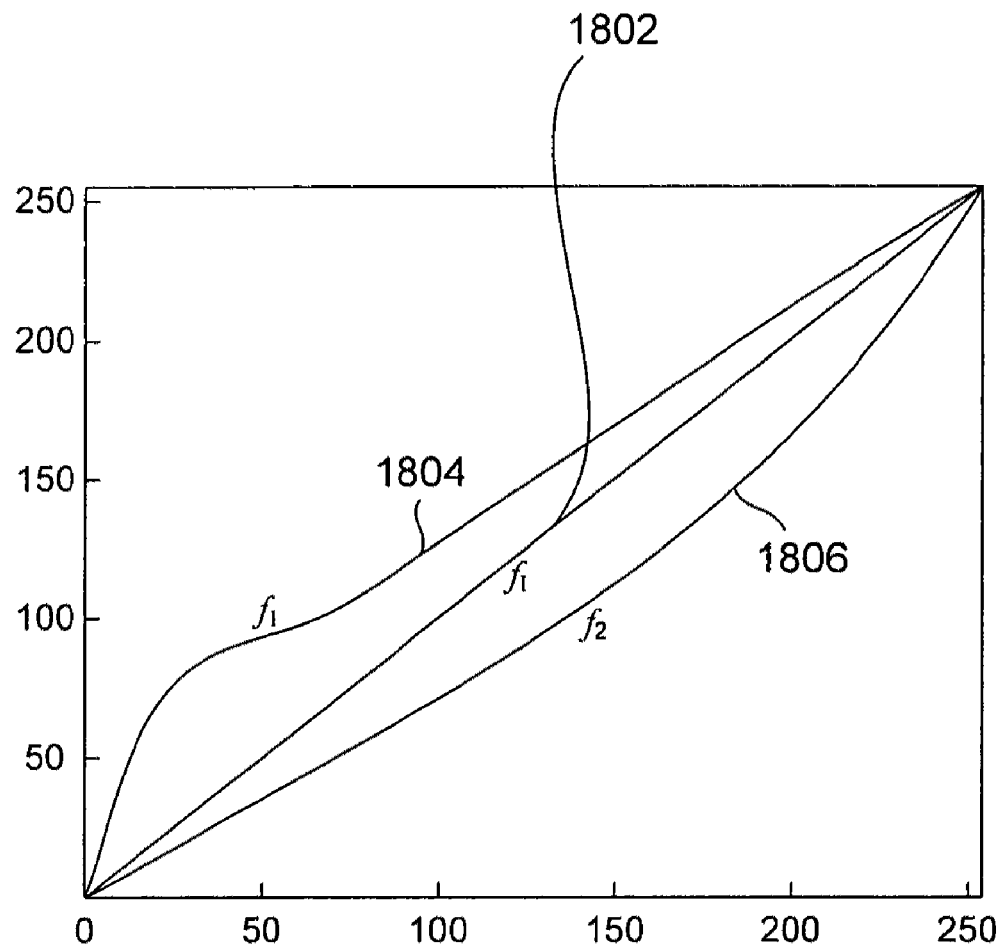
FIG. 18 illustrates an exemplary pair of functions $f_1$ and $f_2$ used in one tone-mapping image-enhancement embodiment of the present invention.

FIG. 17 illustrates a different embodiment of the present invention. In step 1702, an initial image $S_{in}$ is received. In step 1704, upper-envelope function U is computed for the initial image $S_{in}$ by any of various techniques, including the Retinex-based techniques discussed above. In step 1706, a lower-envelope function L is computed for the received image $S_{in}$, either by the method discussed above with reference to FIGS. 12 and 13, or by another method. Next, in step 1710, two functions $f_1$ and $f_2$ are selected or computed in order to apply to the upper-envelope function and lower-envelope function, respectively, to generate the modified upper-envelope function U' and the modified lower-envelope function L', as discussed above. Selection of the functions $f_1$ and $f_2$ can be based on various different criteria or, alternatively, the functions $f_1$ and $f_2$ can be computed from the input image and supplied parameters. For example, the functions $f_1$ and $f_2$ may be represented as lookup tables, generated from histograms representing the pixel-intensity distribution within an image. FIG. 18 illustrates an exemplary pair of functions $f_1$ and $f_2$ used in one tone-mapping image-enhancement embodiment of the present invention. Note that the representation of functions $f_1$ and $f_2$ in FIG. 18 assume a range of pixel values of {0-255}. The function $f_1$ 1802 shown in FIG. 18 is the identity function y=x, to serve as a reference point for representations of functions $f_1$ 1804 and $f_2$ 1806.

Next, in step 1712, an intermediate image S' is computed by:

$$S' = \frac{S_{in}}{U} f_1(U)$$

The intermediate image S' includes pixel intensities that reflect modification of the upper-envelope function U by function $f_1$. Then, in step 1714, the output image $S_{out}$ is produced by:

$$S_{out} = 255 - \frac{255-S'}{L} f_2(L)$$

Thus, the output image $S_{out}$ includes pixel values that reflect modification of both the upper-envelope function U by function $f_1$ and the lower-envelope function L by function $f_2$.

Although the present invention has been described in terms of particular embodiments, it is not intended that the invention be limited to these embodiments. Modifications within the spirit of the invention will be apparent to those skilled in the art. For example, any number of different embodiments of the present invention can be obtained through varying various programming parameters, including programming language, control structures, data structures, modular organization, variable names, and other such programming parameters. As discussed above, any number of different modification functions $f_1$ and $f_2$ can be recomputed or computed during image enhancement in order to achieve any of many different image enhancement goals. Although, in the above discussion, $f_1$ is applied to U and $f_2$ is applied to L, in more general embodiments of the present invention, either or both of $f_1$ and $f_2$ may be applied to both U and L. Local-contrast enhancement of details of the image, global contrast enhancement between shaded and unshaded regions of an image, smoothing, denoising, tone mapping, compression, shadow removal, and a variety of additional image-enhancement goals can be concurrently achieved by selecting or computing appropriate $f_1$ and $f_2$ functions. As discussed above, any of many different techniques can be used to compute the upper-envelope function U and the lower-envelope function L. The method of the present invention can be included in a variety of different devices and systems that perform image enhancement, including digital cameras, printers, image-rendering devices, and image-processing systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A signal-processing system comprising:
   input means for receiving an input image signal $S_{in}$;
   output means for outputting an enhance image signal; and
   a processing component that
      computes upper-envelope and lower-envelope functions U and L with respect to the input image signal $S_{in}$;
      modifies the upper-envelope and lower-envelope functions U and L to produce a modified upper-envelope function U' and a modified lower-envelope function L'; and
      employs the modified upper-envelope function U' and the modified lower-envelope function L' to generate an enhanced output image.

2. The signal-processing system of claim 1 wherein the processing component computes the upper-envelope and lower-envelope functions U and L using a Retinex-based method based on one or more of:
- bilateral filters;
- variational calculus;
- robust recursive envelope operators;
- smoothing filters and operators;
- Poisson equation; and
- infinite impulse response filters.

3. The signal-processing system of claim 2 wherein the processing component computes the upper-envelope and lower-envelope functions U and L based on one or more of the assumptions:
- reflectance is everywhere greater than or equal to 0% and everywhere less than or equal to 100%; and
- illumination and reflectance are at least piecewise spatially smooth.

4. The signal-processing system of claim 1 wherein the processing component computes the upper-envelope and lower-envelope functions U and L based on one or more of the assumptions:
- U and L are at least piecewise spatially smooth;
- large gradients in input image signal, $S_{in}$, are indicative of spatial discontinuity in U and L; and
- small contiguous alternating shaded regions and non-shaded regions within an image are indicative of an absence of spatial discontinuities in U and L.

5. The signal-processing system of claim 1 wherein the processing component modifies the upper-envelope and lower-envelope functions U and L to produce a modified upper-envelope function U' and a modified lower-envelope function L' by:
- determining envelope-modifying functions $f_1$ and $f_2$;
- applying envelope-modifying function $f_1$ to one or both of upper-envelope function U and lower envelope function L to generate a modified upper-envelope function U'; and
- applying envelope-modifying function $f_2$ to one or both of lower-envelope function L and upper-envelope function U to generate a modified lower-envelope function L'.

6. The signal-processing system of claim 5 wherein the processing component determines envelope-modifying functions $f_1$ and $f_2$ by one or more of:
- computing functions $f_1$ and $f_2$ based on statistics computed for the input image signal $S_{in}$ and on specified image enhancements for the enhanced output image;
- selecting functions $f_1$ and $f_2$ from pre-computed functions;
- selecting parameterized functions $f_1$ and $f_2$ from a set of functions and parameters based on specified image enhancements for the enhanced output image.

7. The signal-processing system of claim 5 wherein the processing component employs the modified upper-envelope function $f_1(U)$ to generate an enhanced output image by:
- computing an intermediate image $\hat{S}$ as $$\hat{S} = \frac{S_{in}}{U} f_1(U);$$

- computing an inverse $\hat{L}$ of a lower envelope function L as the upper envelope of $\hat{S}$; and
- using the modified lower-envelope function $f_2(\hat{L})$ to generate an enhanced output image $S_{out}$ by:

$$S_{out} = 255 - \frac{255 - S'}{L} f_2(\hat{L}).$$

8. The signal-processing system of claim 1 wherein the processing component employs the modified upper-envelope function U' and the modified lower-envelope function L' to generate an enhanced output image by:
- computing a details function D from upper-envelope and lower-envelope functions U and L and input image signal $S_{in}$; and
- combining the details function D, modified upper-envelope function U', and modified lower-envelope function L' to produce the enhanced output signal.

9. The signal-processing system of claim 8 wherein the processing component computes the details function D from upper-envelope and lower-envelope functions U and L and input image signal $S_{in}$ by $$D = \frac{S_{in} - L}{U - L}$$

and wherein the processing component computes an enhanced image $\overline{S}$ by $$\overline{S} = D(U' - L') + L'.$$

10. The signal-processing system of claim 8 wherein $\overline{S}$ is computed as $$\overline{S} = f_{U',L'}(D)$$

where $f$ is a monotonic function of D, mapping a range [0, 1] of D values to an output range. [U',L'].

11. The signal-processing system of claim 10 wherein $f_{U',L'}(D)$ is one of:
- a linear function $f_{U',L'}$;
- an S-shaped tone mapping function, where the S-inflection is collocated with a Retinex-type average of an image, A.

12. The signal-processing system of claim 1 wherein the enhanced output image is enhanced with respect to one or more of:
- local-contrast of details;
- global contrast between shaded and unshaded regions of an image;
- smoothness;
- noise; and
- intensity range.

13. A method for enhancing an input image signal $S_{in}$, the method comprising:
- computing upper-envelope and lower-envelope functions U and L with respect to the input image signal $S_{in}$;
- modifying the upper-envelope and lower-envelope functions U and L to produce a modified upper-envelope function U' and a modified lower-envelope function L'; and
- employing the modified upper-envelope function U' and the modified lower-envelope function L' to generate an enhanced output image.

14. The method of claim 13 wherein the upper-envelope and lower-envelope functions U and L are computed using a Retinex-based method based on one or more of:
- bilateral filters,
- variational calculus,
- robust recursive envelope operators,
- smoothing filters and operators, Poisson equation, and infinite impulse response filters; and wherein the upper-envelope and lower-envelope functions U and L are computed based on one or more of the assumptions:

reflectance is everywhere greater than or equal to 0% and everywhere less than or equal to 100%; and illumination and reflectance are at least piecewise spatially smooth.

15. The method of claim 13 wherein the upper-envelope and lower-envelope functions U and L are computed based on one or more of the assumptions:

U and L are at least piecewise spatially smooth;

large gradients in input image signal, $S_{in}$, are indicative of spatial discontinuity in U and L; and small contiguous alternating shaded regions and non-shaded regions within an image are indicative of an absence of spatial discontinuities in U and L.

16. The method of claim 13 wherein the upper-envelope and lower-envelope functions U and L are modified to produce a modified upper-envelope function U' and a modified lower-envelope function L' by:

determining envelope-modifying functions $f_1$ and $f_2$;

applying envelope-modifying function $f_1$ to one or both of upper-envelope function U and lower envelope function L to generate a modified upper-envelope function U'; and applying envelope-modifying function $f_2$ to one or both of lower-envelope function L and upper-envelope function U to generate a modified lower-envelope function L'; and wherein the envelope-modifying functions $f_1$ and $f_2$ are determined by one or more of:

computing functions $f_1$ and $f_2$ based on statistics computed for the input image signal $S_{in}$ and on specified image enhancements for the enhanced output image;

selecting functions $f_1$ and $f_2$ from pre-computed functions;

selecting parameterized functions $f_1$ and $f_2$ from a set of functions and parameters based on specified image enhancements for the enhanced output image.

17. The method of claim 13 wherein a modified upper-envelope function $f_1(U)$ is used to generate an enhanced output image by:

computing an intermediate image $\hat{S}$ as $$\hat{S} = \frac{S_{in}}{U} f_1(U);$$

computing an inverse $\hat{L}$ of a lower envelope function L as the upper envelope of $\hat{S}$; and using the modified lower-envelope function $f_2(\hat{L})$ to generate an enhanced output image $S_{out}$ by:

$$S_{out} = 255 - \frac{255 - S'}{L} f_2(\hat{L}).$$

18. The method of claim 13 wherein a modified upper-envelope function U' and a modified lower-envelope function L' are used to generate an enhanced output image by:

computing a details function D from upper-envelope and lower-envelope functions U and L and input image signal $S_{in}$; and combining the details function D, modified upper-envelope function U', and modified lower-envelope function L' to produce the enhanced output signal.

19. The method of claim 18 wherein the processing component computes the details function D from upper-envelope and lower-envelope functions U and L and input image signal $S_{in}$ by $$D = \frac{S_{in} - L}{U - L}$$

and wherein the processing component computes an enhanced image $\overline{S}$ by $$\overline{S} = D(U' - L') + L'.$$

20. The method of claim 8 wherein $\overline{S}$ is computed as $$\overline{S} = f_{U',L'}(D)$$

where $f_{U',L'}$ is one of:

a monotonic function of D, mapping a range [0, 1] of D values to an output range [U', L'];

a linear function; and an S-shaped tone mapping function, where the S-inflection is collocated with a Retinex-type average of an image, A.

* * * * *

UNITED STATES PATENT AND TRADEMARK OFFICE
CERTIFICATE OF CORRECTION

| | | |
|---|---|---|
| PATENT NO. | : 8,208,750 B2 | Page 1 of 1 |
| APPLICATION NO. | : 11/977969 | |
| DATED | : June 26, 2012 | |
| INVENTOR(S) | : Mani Fischer et al. | |

It is certified that error appears in the above-identified patent and that said Letters Patent is hereby corrected as shown below:

In column 16, line 36, in Claim 20, delete "claim 8" and insert -- claim 18 --, therefor.

Signed and Sealed this
Nineteenth Day of March, 2013

Teresa Stanek Rea
*Acting Director of the United States Patent and Trademark Office*